No. 798,196. PATENTED AUG. 29, 1905.
R. W. LYLE.
CONDUIT FOR ELECTRIC WIRES.
APPLICATION FILED FEB. 24, 1903.
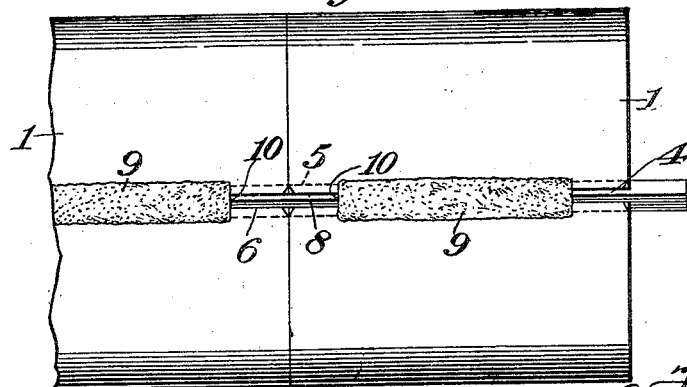
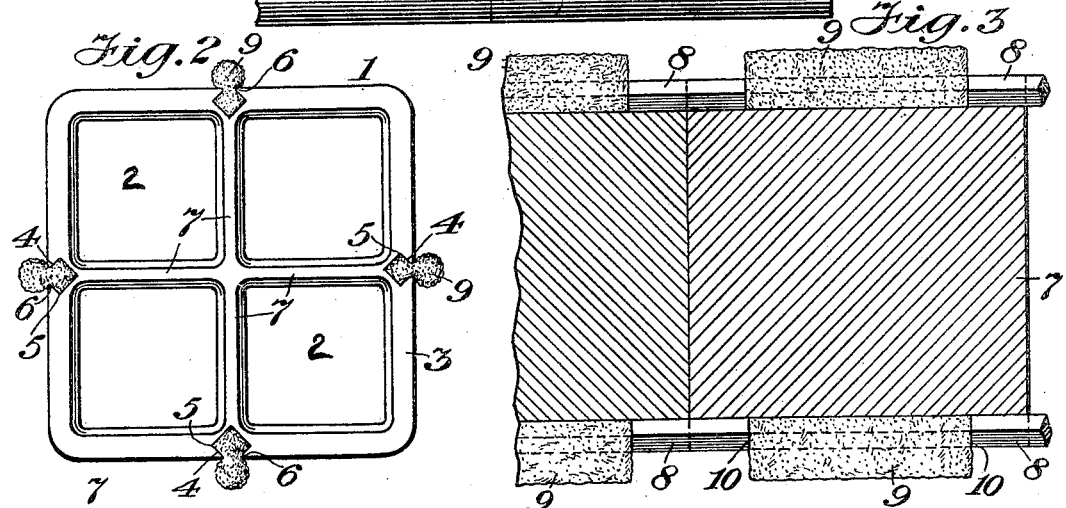
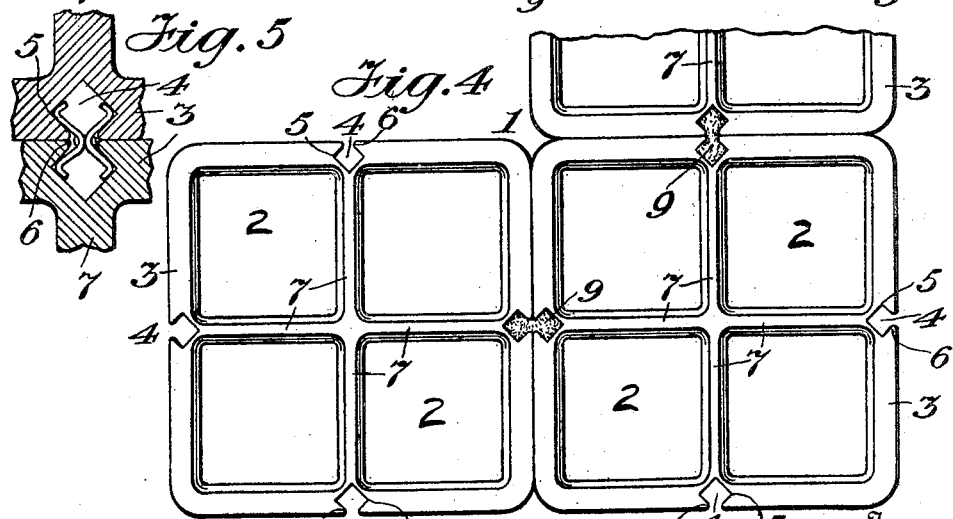
Witnesses
Chas. J. Clagett
J. A. Tybas
By his Attorney,
Inventor
Robert W. Lyle,

UNITED STATES PATENT OFFICE.

ROBERT W. LYLE, OF NEW YORK, N. Y.

CONDUIT FOR ELECTRIC WIRES.

No. 798,196. Specification of Letters Patent. Patented Aug. 29, 1905.

Application filed February 24, 1903. Serial No. 144,748.

*To all whom it may concern:*

Be it known that I, ROBERT W. LYLE, a citizen of the United States, and a resident of New York, in the county and State of New York, have invented certain new and useful Improvements in Conduits for Electric Wires, of which the following is a specification.

This invention relates to conduits for electric wires or other conductors; and it has for its object to provide simple and improved means for more perfectly connecting the sections of the conduit together at the joints.

A further object of my invention is to provide means for connecting the sections of the conduit which will possess advantages in point of simplicity, inexpensiveness, facility in manufacture and construction, convenience, positive connection of the sections in true alinement, effectiveness, and general efficiency.

A further object of my present invention and improvements is to provide means of the character above set forth which will also operate to connect and aline the sections of a plurality of conduits when the latter are "nested" in the manner customarily employed in the laying of conduits of this character.

In the drawings, Figure 1 is a top or plan view illustrating a portion of a conduit embodying my invention. Fig. 2 is an end view of one of the sections, the end keys being shown. Fig. 3 is a longitudinal vertical sectional view of the construction illustrated in Fig. 1, taken on a central plane. Fig. 4 is an end view illustrating the connecting of the sections of different conduits when the latter are nested, the end keys not being shown. Fig. 5 is a detail sectional view illustrating a modification.

Corresponding parts in all the figures are denoted by the same reference characters.

1 designates the conduit-sections, which are in the main constructed in the usual manner and embody one or more ducts 2 for the wires or cables. In the illustration shown in the accompanying drawings I have indicated what is known as a "four-way" section, having four ducts; but it will be understood that conduit-sections embodying any suitable or desired number of ducts may be employed in relation to my present invention.

The conduit-sections 1 are of substantially square or rectangular contour in cross-section, so that they present corresponding sides when nested in the manner indicated in Fig. 4. The sections 1 are exteriorly provided in the surface of their outer wall or shell 3 with longitudinal grooves 4, which extend from end to end of the section and are undercut, as illustrated at 5, throughout their length, so that the inner part of such grooves is larger than the longitudinal opening or entrance 6, the latter being of "reduced" size with respect to the body or main portion of the groove.

The grooves 4 are preferably provided on all the sides of the conduit-section and are preferably arranged on a median line coincident with the plane of the partitions 7, which form the interior ducts. In the case of a four-way conduit this median line will be the median line of the conduit itself; but in the case of a conduit having a greater number of ducts, and consequently a greater number of dividing-partitions, the median plane of the partitions would of course not be the median line of the conduit itself, and consequently a plurality of the grooves 4, arranged on the median line of the partitions, would be provided at the different sides of the conduit. The purpose of this arrangement of the grooves on the median plane is to bring the longitudinal opening or entrance of the grooves in relative registering position when the conduits are nested, as illustrated in Fig. 4.

In connecting the sections 1 to form the conduit their corresponding ends are abutted together, as illustrated in Fig. 1, and across the joint thus formed extends a relatively short key or pin 8, which is of angular contour in cross-section or corresponds to the undercut contour of the groove, so that the key will not drop from engagement with the grooves through the longitudinal entrance or opening thereof. The keys 8 thus operate to retain two adjoining sections 1 in alinement, as will be readily understood. The keys 8 extend relatively only a short distance within the ends of the longitudinal undercut grooves 4, as shown in the drawings.

To prevent longitudinal movement of the keys 8 with respect to the joint between the sections, the middle portion of the longitudinal undercut grooves 4 is filled with cement or other suitable plastic substance, as at 9, which operates not only to fill the grooves between the joint-keys, but also forms a stop-wall, as at 10, which constitutes a stop for the keys against longitudinal movement and divides the longitudinal undercut grooves 4 into relatively short open end sections for the accommodation of said keys. In manufacture the feasible and inexpensive method is to form the undercut groove longitudinally of the conduit, extending from end to end, and in such grooves the stops for limiting movement of the joint-keys are conveniently and inexpensively formed by simply filling the portion of the groove intermediately between the end keys with cement or other plastic substance, inasmuch as ordinarily in laying conduits of this class the outer surfaces are usually cemented. It will be understood that the cross-sectional form of the undercut grooves is not restricted to the angular form herein illustrated, but may be of curved or any other contour which provides a reduced entrance or opening on the longitudinal plane of the groove.

The construction and means herein illustrated and described for filling the intermediate portion of the longitudinal grooves and forming the key-stop provides, it will be noted, a complete closure-wall extending entirely across and filling the cross-section of the groove at the end of the key, whereby the passage of any moisture between the end of the key and the groove-filling and between the key and end portion of the groove and the joints between the sections 1 to the ducts is effectually prevented.

In nesting a plurality of conduits constructed under and according to my present invention and improvements the surplus cement or other plastic substance which is filled into the main part of the longitudinal undercut groove will fill into the corresponding registering groove of another conduit-section when such sections are placed side by side or one on top of the other, as illustrated in Fig. 4, thus constituting a longitudinal double key for connecting and retaining the sections of the different nested conduits side by side and with their side walls or surfaces in close proper relationship. The median-line arrangement of the longitudinal grooves provides for this connection of the sections of the different conduits when nested whatever position the different sections may occupy when nested, inasmuch as the sides of the sections correspond in the arrangement of the registering longitudinal grooves. The cement or plastic material extending longitudinally in the grooves forms when set a solid double key, one half of which is retained in the undercut groove of one section, while the other half is retained in the undercut groove of the other section, the web between said halves being accommodated in the reduced longitudinal opening or entrance of the adjoining grooves, as will be readily understood by reference to Fig. 4, and this key extends, it will be noted, in effectual longitudinal relationship to the length of the conduit-sections. It will be understood that in lieu of forming side keys which are initially of cement or plastic material, and subsequently "set," a key which is initially solid and of a contour corresponding to both the grooves and with a connecting-web may under some circumstances, if desired, be inserted in the construction of the conduits so that it engages the two grooves, respectively, of conduit-sections arranged side by side. In similar manner a metallic key, such as illustrated in Fig. 5, may be sprung into engagement with the two grooves for the purpose above described.

The filling of cement or other material occupying the middle portion of the groove constitutes, effectually, a key the ends of which terminate a short distance from the ends of the conduit-section, which middle key is therefore intermediate with respect to the short end keys or pins at the joints, and this middle or intermediate key, being separate and distinct from the material of the conduit-section itself, may of course be formed of any suitable or adapted material and fitted in the middle portion of the groove.

The operation and advantages of my invention will be readily understood by those skilled in the art to which it appertains. The construction and arrangement as herein shown and described not only provides inexpensive and effective means for alining the conduit-sections and connecting them at their joints and providing stops for the short keys, but it also provides in a simple and convenient manner for the longitudinal connection of the sections of different conduits when the latter are nested.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. A conduit-section provided exteriorly with longitudinal grooves extending from end to end and having filled into the middle portion of said grooves cement or other material which divides the groove into relatively short open end sections.

2. A conduit-section provided exteriorly with longitudinal grooves extending from end to end which are undercut or reduced at their longitudinal entrance or opening and having filled into the middle portion of said grooves cement or other material which divides the grooves into relatively short open end sections.

3. The combination with a conduit-section exteriorly provided with longitudinal grooves extending from end to end, of a cement or plastic filling occupying the middle portion of said groove and forming at its ends stop-walls at the inner ends of relatively short open end portions of the groove.

4. The combination, with a conduit-section exteriorly provided with longitudinal grooves extending from end to end, and undercut or reduced at their longitudinal entrance or opening, of a material filled in and occupying the middle portion of said groove and forming at its ends stop-walls at the inner ends of relatively short open end portions of the groove.

5. A conduit-section exteriorly provided with longitudinal grooves extending from end to end and having the middle portion of the groove filled in with material the ends of which form a stop-wall extending entirely across and fully closing the groove at a point a relatively short distance from the end of the section, for the purpose set forth.

6. A conduit-section exteriorly provided with longitudinal grooves extending from end to end and undercut or reduced at their longitudinal entrance or opening and having the middle portion of the groove filled in with material the ends of which form a stop-wall extending entirely across and fully closing the groove at a point a relatively short distance from the end of the section, for the purpose set forth.

7. The combination, with a conduit-section exteriorly provided with a longitudinal groove extending from end to end, of a key occupying the middle portion of said longitudinal groove and having its ends terminating a relatively short distance from the ends of the conduit-section.

8. The combination, with a conduit-section exteriorly provided with a longitudinal groove extending from end to end and undercut or reduced at its longitudinal entrance or opening, of a key occupying the middle portions of said longitudinal groove and having its ends terminating a relatively short distance from the ends of the conduit-section.

9. The combination, with a conduit-section exteriorly provided with a longitudinal groove extending from end to end, of a key occupying the middle portion of the longitudinal groove and having its ends terminating a relatively short distance from the ends of the conduit-section, said key having a portion projecting from and beyond the longitudinal entrance or opening of the groove.

10. The combination, with a conduit-section exteriorly provided with a longitudinal groove extending from end to end, and undercut or reduced at its longitudinal entrance or opening, of a key occupying the middle portion of the longitudinal groove and having its ends terminating a relatively short distance from the ends of the conduit-section, said key having a portion projecting from and beyond the longitudinal entrance or opening of the groove.

11. The combination, with a conduit-section provided exteriorly with longitudinal grooves extending from end to end, of relatively short keys or pins occupying the end portions of said groove, and an intermediate key arranged between said short end keys and occupying the middle portion of the groove.

12. The combination, with a conduit-section provided exteriorly with longitudinal grooves extending from end to end and undercut and having a longitudinal reduced entrance or opening, of relatively short keys or pins occupying the end portions of said groove, and an intermediate key arranged between said short end keys and occupying the middle portion of the groove.

In testimony whereof I have signed my name in the presence of the subscribing witnesses.

ROBERT W. LYLE.

Witnesses:
J. R. LITTELL,
J. C. PYBAS.